US009293915B2

(12) United States Patent
Baba et al.

(10) Patent No.: US 9,293,915 B2
(45) Date of Patent: Mar. 22, 2016

(54) ELECTRIC POWER CONTROL DEVICE AND ELECTRIC POWER CONTROL SYSTEM USING SAME (75) Inventors: Akira Baba, Osaka (JP); Kiyotaka Takehara, Nara (JP); Kenji Nakakita, Osaka (JP); Shinpei Hibiya, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 548 days.

(21) Appl. No.: 13/885,893

(22) PCT Filed: Dec. 13, 2011

(86) PCT No.: PCT/JP2011/078788
§ 371 (c)(1),
(2), (4) Date: May 16, 2013

(87) PCT Pub. No.: WO2012/081575
PCT Pub. Date: Jun. 21, 2012

(65) Prior Publication Data
US 2013/0229059 A1 Sep. 5, 2013

(30) Foreign Application Priority Data
Dec. 13, 2010 (JP) ................................ 2010-276789

(51) Int. Cl.
*H02J 3/38* (2006.01)
*H02J 1/00* (2006.01)
*H02J 3/00* (2006.01)
*H02J 13/00* (2006.01)

(52) U.S. Cl.
CPC . *H02J 1/00* (2013.01); *H02J 3/008* (2013.01); *H02J 3/383* (2013.01); *H02J 13/0079* (2013.01); *Y02B 10/14* (2013.01); *Y02E 10/563* (2013.01); *Y04S 50/10* (2013.01); *Y10T 307/438* (2015.04); *Y10T 307/50* (2015.04); *Y10T 307/826* (2015.04)

(58) Field of Classification Search
CPC ........................................................ H02J 3/008
See application file for complete search history.

(56) References Cited

U.S. PATENT DOCUMENTS

2005/0234599 A1  10/2005  Kurokami et al.
2011/0153098 A1*  6/2011  Tomita .................... H02J 3/008
                                         700/287

FOREIGN PATENT DOCUMENTS

EP      2 224 568 A2    9/2010
JP      2002-152976 A   5/2002
(Continued)

OTHER PUBLICATIONS

International Search Report for corresponding International Application No. PCT/JP2011/078788 mailed Mar. 19, 2012.
Form PCT/ISA/237 for corresponding International Application No. PCT/JP2011/078788 dated Mar. 19, 2012.

*Primary Examiner* — Fritz M Fleming
(74) *Attorney, Agent, or Firm* — Renner, Otto, Boisselle & Sklar, LLP (57) ABSTRACT

A controller installed at each consumer side comprises: a power generation amount acquisition unit acquiring the amount of electricity that has been generated in a solar cell; a power selling amount acquisition unit acquiring the amount of electricity for sale that has been allowed to flow into an electric power system by reverse power flow, among the electricity generated in the solar cell; and a power selling suppression control unit configured to set a threshold value for the amount of the electricity for sale, as proportional to the amount of the generated electricity acquired by the power generation amount acquisition unit, and configured to suppress the reverse power flow into the electric power system so that the amount of the electricity for sale is set to the threshold value or less.

6 Claims, 7 Drawing Sheets

(56) References Cited

FOREIGN PATENT DOCUMENTS

| JP | 2006-121853 A | 5/2006 | |
| JP | 4266003 B | 5/2009 | |
| JP | 2009-268247 A | 11/2009 | |
| JP | 2010-220406 A | 9/2010 | |
| JP | 5580183 B2 * | 8/2014 | H02J 3/008 |

* cited by examiner

FIG. 7

ELECTRIC POWER CONTROL DEVICE AND ELECTRIC POWER CONTROL SYSTEM USING SAME

TECHNICAL FIELD

The invention relates generally to an electric power control device and an electric power control system using the same.

BACKGROUND ART

Recently, a power generation device, such as a solar power generation device, a fuel cell or a wind power generation device, increasingly has been installed at electric power consumer sides, such as factories or houses. Further, a grid connected system also has been put to practical use. The grid connected system makes this kind of power generation device perform the grid connected operation with an electric power system of a commercial power source, thereby using the power generation device as a dispersed power source. In the grid connected system, surplus electricity, which is obtained by subtracting the amount consumed in a consumer side from the amount of electricity generated in the dispersed power source, is allowed to flow into the electric power system of the commercial power source by reverse power flow. Then, when the surplus electricity is allowed to flow from the consumer side to the electric power system by the reverse power flow, there is also the case where the consumer gets paid for the amount of the surplus electricity allowed by the reverse power flow from an electric power provider that provides electricity as the commercial power.

When the number of consumer sides installing the dispersed power sources is increased and a plurality of dispersed power sources allow electricity to flow into the electric power system by the reverse power flow, there is a possibility that a voltage of the electric power system is increased, a frequency in the electric power system is changed due to load reduction or phase-lead of the system voltage is generated. Especially, when the number of dispersed power sources connected to the electric power system increases, such a phenomenon is easily generated. Furthermore, the longer a distance of a pole transformer to the dispersed power source is, the more the voltage of the electric power system is easily increased due to the reverse power flow performed by other dispersed power source located closer to a pole transformer.

In order to prevent the above-mentioned problems generated in the case where the grid connected system makes the dispersed power source perform the grid connected operation with the electric power system, the dispersed power source has an output suppression function that suppresses the electricity flowing into the electric power system when the voltage of the electric power system increases upon the reverse power flow. Also, as described above, the longer the distance of the pole transformer to the dispersed power source is, the more the voltage of the electric power system is easily increased, and the more the output suppression function also get executed easily. Thus, there has been a difference between frequencies of the output suppression controls performed at consumer sides installing the dispersed power sources, or a difference between the amounts of the electricity allowed to flow by the reverse power flow at consumer sides. In order to correct such an inequality generated among the consumer sides, there has been proposed a technique, in which the longer a distance of a pole transformer to each dispersed power source is, the higher the system voltage at which the output suppression control starts is set, thereby reducing the difference between frequencies of the output suppression controls generated (see Japanese Patent Publication No. 4266003).

As described above, the phenomena, such as increasing of the system voltage, change of the frequency and the phase-lead, are monitored in each dispersed power source. Then, when the phenomena are generated beyond prescribed volumes, the reverse power flow into the electric power system is suppressed, thereby reducing the effect on the electric power system. Also, the technique described in the above-mentioned document sets the voltage at which the output suppression control starts, based on the distance of the pole transformer to the dispersed power source, thereby equally allocating the opportunity of the reverse power flow to each dispersed power source. In other words, the technique can equally allocate the potential of selling the surplus electricity regardless of the distance of the pole transformer to the dispersed power source.

Then, according to the technique described in the above-mentioned document, each dispersed power source sets a threshold value for the system voltage at which the output suppression control starts, based on impedance between the pole transformer and the dispersed power source (that is, based on the distance), thereby correcting the inequality with respect to the opportunity of the reverse power flow into the electric power system. Therefore, as the number of the dispersed power sources connected to the secondary side of the pole transformer is increased in neighborhood with houses lined so close together, a difference between threshold values set for adjacent dispersed power sources is reduced. Thus, in regard to setting of the threshold value, high accuracy is required.

When setting the above-mentioned threshold value, each dispersed power source also needs to calculate the impedance between the pole transformer and the dispersed power source connected to the secondary side of the pole transformer. Therefore, when the dispersed power source is installed, acquiring of information regarding a distribution network topology, a wiring distance and a line type is needed, and further, information regarding spec on the dispersed power source is also needed. That is, the management of a lot of information is needed, and therefore, there has been a problem that the cost of data management is increased.

As explained above, the technique described in the above-mentioned document has a problem that it is difficult to be implemented under conditions that there is a large number of the dispersed power sources connected to the secondary side of the pole transformer and there is a small difference between distances of cable runs in the electric power system among the adjacent dispersed power sources.

Then, as explained above, when the reverse power flow is suppressed for the convenience of the electric power provider side, the surplus electricity is not allowed to flow into the electric power system by the reverse power flow even if the surplus electricity is generated at the consumer side. That is, because the consumer can not get paid for the amount of the surplus electricity from the electric power provider by performing the reverse power flow of the surplus electricity, such suppression causes economic damage to the consumer. Therefore, the consumer needs an extended period to recoup the cost invested in the installation of the dispersed power source, and the cost-effectiveness is reduced. This contributes to preventing of the diffusion of the dispersed power source.

Further, when the output suppression control is performed at the consumer side, the amount of electricity generated in the dispersed power source decreases due to the output suppression control despite essentially the state where the dispersed power source can generate power. As a result, there is a problem that the operational efficiency of the dispersed power source is reduced. Especially, the solar power generation device converts solar energy into electric energy, and fuel expenses are not needed. Thus, it is not economical to suppress the power generation despite the state where the dispersed power source can generate power. Accordingly, there has been also a possibility to reduce the effect of a subsidy system directed at the diffusion and promotion of the solar power generation device.

So, there has been also considered a large energy storage system installed in the electricity network by the electric power provider. In this case, the large energy storage system stores the electricity flowing from the dispersed power source by the reverse power flow, thereby preventing the instability of the system voltage and reducing the frequency of the output suppression control performed at the dispersed power source side. However, it is expected that the energy storage system is very expensive to install, and the electric power provider does not benefit much economically. Also, it is difficult to secure a place for the installation of the energy storage system in a residential area. Therefore, there is a high possibility that such a large energy storage system does not enable the diffusion of the dispersed power source.

DISCLOSURE OF THE INVENTION

It is an object of the present invention to provide an electric power control device and an electric power control system using the same, which can stabilize an electric power system by suppressing, as needed, electricity flowing by reverse power flow, while reducing consumer's economic damage.

An electric power control device of the present invention comprises a power generation amount acquisition unit, a power selling amount acquisition unit, a threshold value setting unit and a power selling suppression control unit. The power generation amount acquisition unit acquires the amount of electricity that has been generated in a power generation device installed at a consumer side. The power selling amount acquisition unit acquires the amount of electricity for sale that has been allowed to flow into an electric power system by reverse power flow, among the electricity generated in the power generation device. The threshold value setting unit is configured to set a threshold value for the amount of the electricity for sale, as proportional to the amount of the generated electricity acquired by the power generation amount acquisition unit. The power selling suppression control unit is configured to suppress the reverse power flow into the electric power system so that the amount of the electricity for sale is set to the threshold value or less.

According to the electric power control device of the present invention, the electric power system can be stabilized by suppressing, as needed, electricity flowing by reverse power flow while reducing the consumer's economic damage.

It is preferred that the electric power control device further uses, as a new power selling piece rate, a value obtained by multiplying a ratio of the amount of the generated electricity to the threshold value by a basic power selling piece rate.

In the electric power control device, it is preferred that the new power selling piece rate is used for calculating a power selling price, when the reverse power flow is suppressed by the power selling suppression control unit.

Preferably, the electric power control device further comprises: a storage battery storing electricity that have not been allowed to flow by the suppression of the reverse power flow, when the reverse power flow is suppressed by the power selling suppression control unit; and a charge-discharge control unit controlling charging and discharging of the storage battery, wherein when surplus electricity, obtained by subtracting consumed amount from the amount of the electricity that has been generated in the power generation device, does not exceed the threshold value, the charge-discharge control unit controls discharging of the storage battery to supply electricity into a load, thereby increasing electricity allowed to flow into the electric power system by the reverse power flow.

In the electric power control device, it is preferred that the threshold value is set by dividing the amount of the generated electricity acquired by the power generation amount acquisition unit by a coefficient $\alpha$ which is more than 1.

An electric power control system of the present invention comprises: the above-mentioned electric power control device installed at each of a plurality of consumer sides; and a management server communicating with the electric power control device to monitor and control the suppression state of the reverse power flow, wherein when the electric power control device installed at any one of the plurality of consumer sides suppresses the reverse power flow, the management server instructs electric power control devices installed at consumer sides, which do not suppress the reverse power flow, to decrease the threshold value.

According to the electric power control system of the present invention, the electric power system can be stabilized by suppressing, as needed, electricity flowing by reverse power flow while reducing each consumer's economic damage.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

An electric power control device and an electric power control system using the same according to the present embodiment will be explained referring to drawings.

Figure 2:
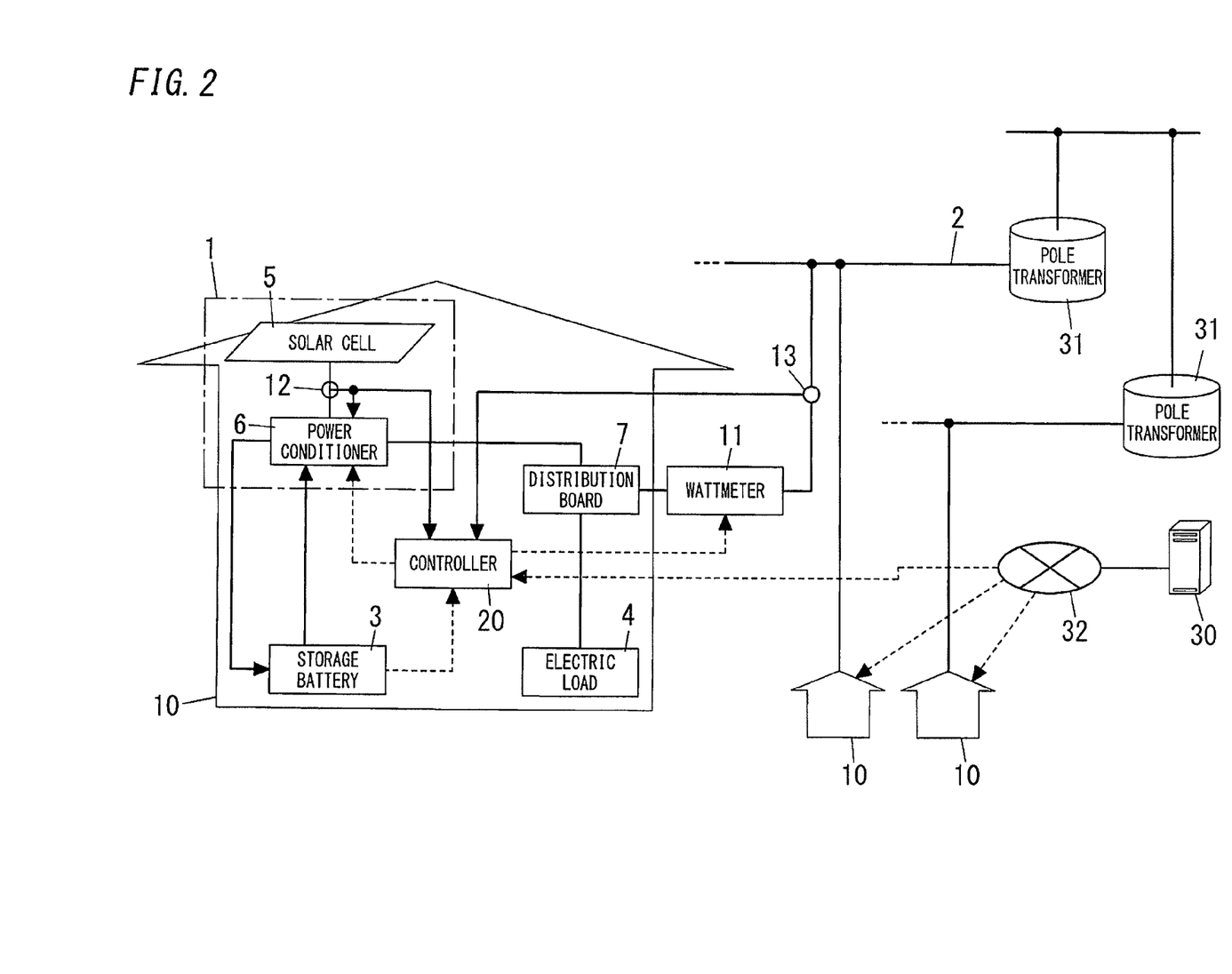
FIG. 2 is a system configuration diagram showing an electric power control system using the electric power control device according to the present embodiment.

FIG. 2 shows a configuration diagram of the electric power control system. The electric power control system performs a grid connected operation of a dispersed power source 1 installed at a consumer's house 10; and an electric power system 2 of a commercial power source. Further, a storage battery 3 is provided in at least one of outside and inside of the consumer's house 10. The storage battery 3 is provided to store electricity which is not allowed to flow into the electric power system 2 by reverse power flow, among surplus electricity which is obtained by subtracting the amount consumed in an electric load 4 from the amount of electricity that has been generated at the dispersed power source 1. The storage battery 3 supplies electricity to the electric load 4, as needed.

The consumer's house 10 is connected to the secondary side of a pole transformer 31 installed at the electric power system 2 of a commercial power source. The secondary side of each pole transformer 31 provides the commercial power source to a plurality of consumers' houses 10. Here, in the embodiment described below, it is assumed the case where the secondary side of each pole transformer 31 is connected to a plurality of dispersed power sources 1. An example in drawing illustrates a configuration that a controller 20 installed at the consumer's house 10 can communicate with a management server 30 via Internet 32 being a wide area network. The functions of the controller 20 and management server 30 will be explained below.

In the illustrated example, a solar power generation device is used as the dispersed power source 1. The solar power generation device includes a solar cell 5 and a power conditioner 6 that converts a DC voltage outputted from the solar cell 5 into an AC voltage. Also, the power conditioner 6 has a function that controls charging and discharging of the storage battery 3. The solar power generation device is one example of dispersed power sources. The dispersed power source 1 may be a power generation device utilizing recyclable energy, such as a wind power generation device or a small hydro power generation device. Or the dispersed power source 1 may be a fuel cell, a cogeneration device or the like.

The power conditioner 6 is connected to a distribution board 7, and the interconnection of the dispersed power source 1 and the electric power system 2 of the commercial power source is performed inside the distribution board 7. The electric load 4 is connected to a branch breaker (not shown) stored in the distribution board 7, and receives the output from the power conditioner 6 and the power from the electric power system 2. That is, the commercial power source, the storage battery 3 and the solar cell 5 can be utilized as the power source for the electric load 4. In this case, when electricity generated in the dispersed power source 1 exceeds electricity consumed in the electric load 4 and a surplus is present in the electricity generated in the dispersed power source 1, the distribution board 7 has a function that allows the surplus to flow into the electric power system 2 by reverse power flow.

Further, a wattmeter 11 is installed at the consumer's house 10. The wattmeter 11 measures electricity that has been received from the electric power system 2 of the commercial power source (that is, electricity purchased from an electric power provider), and electricity that has been allowed to flow into the electric power system 2 of the commercial power source by the reverse power flow (that is, electricity sold to the electric power provider). The wattmeter 11 stores a power purchasing piece rate and a power selling piece rate for each period of time in own memory. The wattmeter 11 calculates a power purchasing price based on the measurement result of the purchased power and the power purchasing piece rate, and calculates a power selling price based on the measurement result of the sold power and the power selling piece rate.

Further, a voltage sensor 12 is installed at the consumer's house 10 to detect electricity that has been generated in the solar cell 5.

At the consumer's house 10, a voltage sensor 13 is also installed near a connection point receiving the power from the electric power system 2 to detect a voltage of the electric power system 2. The voltage sensor 13 is used to compare the voltage of the electric power system 2 with a threshold voltage to determine whether or not the surplus electricity is allowed to flow into the electric power system 2 by the reverse power flow.

Further, a controller (the electric power control device) 20 is installed at the consumer's house 10. The controller 20 determines a supply destination of electricity outputted from the solar cell 5 by controlling the power conditioner 6. The supply destination is the electric load 4 or the electric power system 2. The controller 20 can select either supplying the electricity generated in the solar cell 5 directly to the supply destination without storage, or storing the generated electricity in the storage battery 3 temporarily and then supplying the electricity to the supply destination. The supply destination of the electricity generated in the solar cell 5 is determined by the controller 20 as described below.

Figure 1:
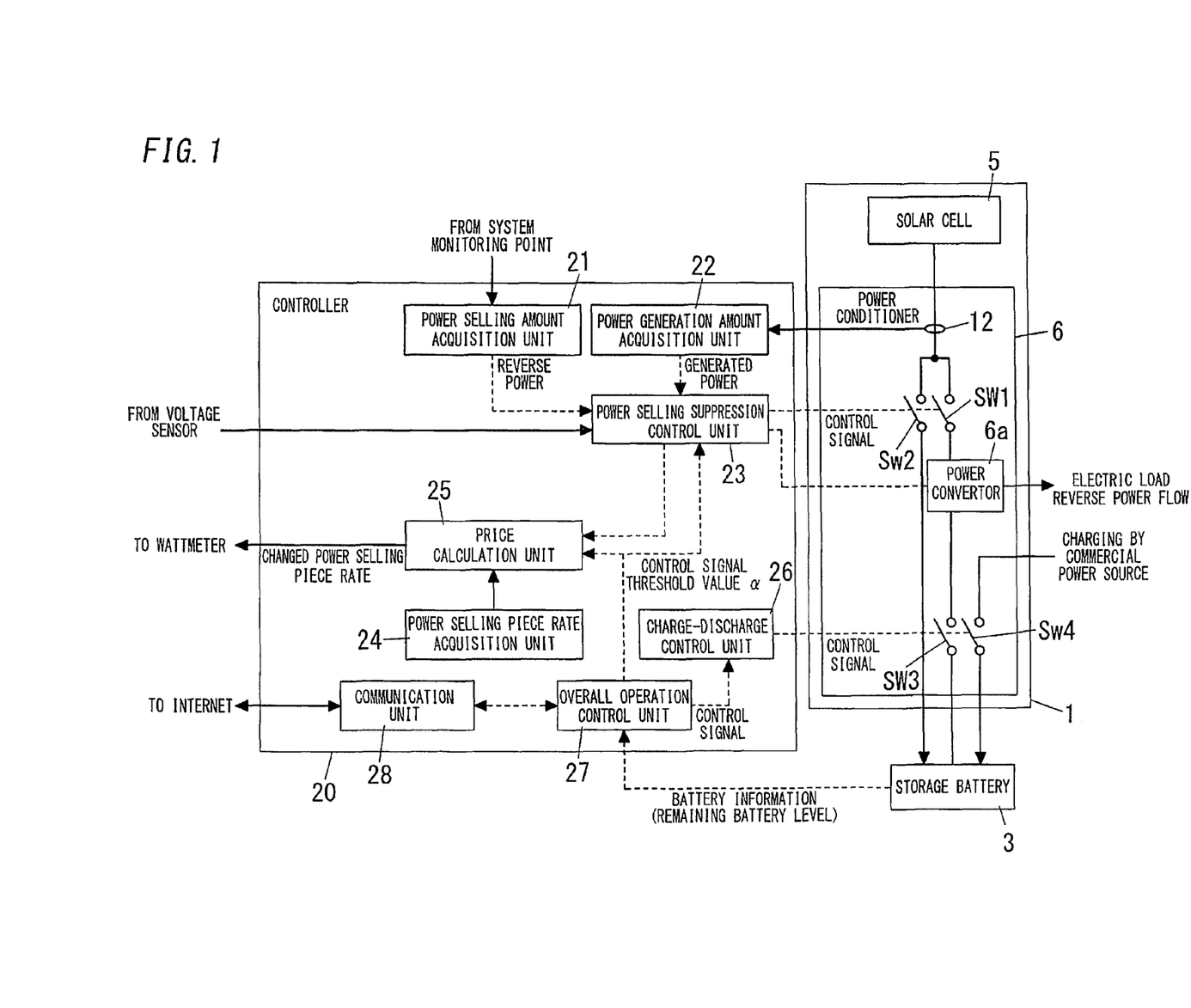
FIG. 1 is a block diagram showing an electric power control device according to the present embodiment.

Thus, as shown in FIG. 1, the power conditioner 6 is provided with: a switch SW2 used for selecting the storage battery 3 as the supply destination of the electricity generated in the solar cell 5; and a switch SW1 used for selecting the distribution board 7 (that is, the electric load 4) as the supply destination. The power conditioner 6 is further provided with a switch SW3 used for selecting whether or not electricity stored in the storage battery 3 is supplied to the distribution board 7. In the illustrated example, the power conditioner 6 is further provided with a switch SW4 that can select a state where the storage battery 3 is charged using electricity outputted from the electric power system 2 of the commercial power source. However, because this switch SW4 is not an important feature, the detailed explanation is omitted.

In the power conditioner 6, when the storage battery 3 and solar cell 5 supply electricity to the distribution board 7, a power convertor 6a converts a DC power into an AC power and supplies the AC power to the distribution board 7. When the storage battery 3 is charged using electricity outputted from the electric power system 2 of the commercial power source, a power convertor (not shown) converts an AC power into a DC power and the storage battery 3 is charged using the DC power.

The controller 20 is configured using a processor executing a program and a memory, and achieves functions explained below by executing the program. That is, the controller 20 includes a power selling amount acquisition unit 21, a power generation amount acquisition unit 22, a power selling suppression control unit 23, a power selling piece rate acquisition unit 24, a price calculation unit 25, a charge-discharge control unit 26, an overall operation control unit 27 and a communication unit 28.

The power selling amount acquisition unit 21 periodically acquires measured values of a voltage and a current from a voltage sensor and a current sensor located at a system monitoring point, respectively. Then, the unit 21 acquires the amount of electricity for sale, which has been allowed to flow into the electric power system 2 by the reverse power flow, based on the measured values and a phase difference.

The power generation amount acquisition unit 22 periodically acquires an output voltage of the solar cell 5 from the voltage sensor 12, thereby acquiring the amount of electricity generated in the solar cell 5.

The power selling suppression control unit 23 functions as a threshold value setting unit, and obtains a threshold value proportional to the amount of the generated electricity, by calculating using a coefficient α (α>1) described below with the amount of the generated electricity inputted from the power generation amount acquisition unit 22. For example, when the coefficient α is set to 2, the amount of the generated electricity is divided by the coefficient α. Therefore, the threshold value for the amount of the electricity for sale is set to a value obtained by multiplying the amount of the generated electricity by $1/\alpha$ (=½). Then, the power selling suppression control unit 23 turns the switch SW1 on, when the amount of the sold power inputted from the power selling amount acquisition unit 21 is less than or equal to the threshold value. At this time, an output of the power conditioner 6 is supplied to the distribution board 7, and then the surplus electricity, obtained by subtracting the amount consumed in the electric load 4 from the amount of the electricity generated in the solar battery 5, is allowed to flow into the electric power system 2 by the reverse power flow. On the other hand, the power selling suppression control unit 23 turns the switch SW1 off and turns the switch SW2 on, when the amount of the sold power inputted from the power selling amount acquisition unit 21 exceeds the threshold value. In this case, the unit 23 suppresses the reverse power flow, and charges the storage battery 3, using the generated electricity.

The power selling piece rate acquisition unit 24 acquires a setting value of a power selling piece rate from the wattmeter 11.

When the amount of electricity for sale is suppressed by the power selling suppression control unit 23, the price calculation unit 25 sets a new power selling piece rate in the wattmeter 11. In this case, the new power selling piece rate is a value which is obtained by multiplying an additional rate explained below by the setting value of the power selling piece rate acquired by the power selling piece rate acquisition unit 24 at the time of occurrence of the suppression.

The charge-discharge control unit 26 turns the switches SW3, SW4 on or off based on a control signal inputted from the overall operation control unit 27, thereby charging and discharging the storage battery 3.

The overall operation control unit 27 performs overall controls in the controller 20, and outputs the coefficient α into the power selling suppression control unit 23, and outputs control signals into the unit 23 and the price calculation unit 25 to control those operations. Also, the overall operation control unit 27 acquires information regarding the storage battery 3, such as remaining battery level, from the storage battery 3, and outputs, into the charge-discharge control unit 26, a control signal based on the information to control the charging and discharging of the storage battery 3.

The communication unit 28 communicates with the management server 30 via the Internet 32.

Next, operation according to the present system will be explained. When the sun rises, the solar cell 5 starts to generate electricity and the amount of the electricity generated in the solar cell 5 is increased with the sun elevation. The power conditioner 6 acquires the electricity from the solar cell 5 by performing Maximum Power Point Trucking (MPPT) control, and supplies the electricity into the electric load 4 located in the house, as an AC power, through the distribution board 7.

Here, when the electricity generated in the solar cell 5 is less than or equal to electricity (power demand) consumed in the electric load 4, all of the electricity generated in the solar cell 5 is consumed in the electric load 4. Meanwhile, when the electricity generated in the solar cell 5 exceeds the power demand in the house, electricity, obtained by subtracting the power demand (consumed power) from the generated electricity, becomes surplus electricity and then, the surplus electricity is allowed to flow into the electric power system 2 by the reverse power flow. That is, among the electricity generated in the solar cell 5, the surplus electricity is sold through the electric power system 2.

As described above, when the generated electricity exceeds the power demand at each consumer's house 10 and the reverse power flow is performed at each consumer's house 10, the voltage of the electric power system 2 is increased. The power selling suppression control unit 23 in the controller 20 acquires the voltage of the electric power system 2 from the voltage sensor 13 for each predetermined time. Then, when the voltage of the electric power system 2 exceeds a predetermined reference value, the power selling suppression control unit 23 operates to suppress the reverse power flow into the electric power system 2. When suppressing the reverse power flow, the power selling suppression control unit 23, functioning as the threshold value setting unit, acquires the amount of the electricity generated in the solar cell 5 from the power generation amount acquisition unit 22 at specified time intervals, and sets a threshold value for the amount of electricity for sale, as proportional to the amount of the generated electricity. That is, the power selling suppression control unit 23 sets, as the threshold value at the time, a value [(the amount of the generated electricity)/α] obtained by dividing the amount of the present generated electricity inputted periodically from the power generation amount acquisition unit 22 by a coefficient α which is set by the overall operation control unit 27.

In this case, when the amount of the sold power inputted from the power selling amount acquisition unit 21 is less than or equal to the threshold value, the power selling suppression control unit 23 turns the switch SW1 on and turns the switch SW2 off in order to supply the electricity generated in the solar cell 5 into the distribution board 7. Accordingly, the output suppression is not performed. On the other hand, when the amount of the sold power inputted from the power selling amount acquisition unit 21 exceeds the threshold value, the power selling suppression control unit 23 controls the power convertor 6a to decrease the output, and turns the switch SW2 on to charge the storage battery 3, using part of the generated electricity. Accordingly, the amount of the electricity for sale is suppressed so as to be the threshold value or less.

Also, when the output suppression control is performed by the power selling suppression control unit 23, the price calculation unit 25 uses, as an additional rate, the above-mentioned coefficient α inputted from the overall operation control unit 27, and uses, as a new power selling piece rate, a value [(the power selling piece rate)×α] obtained by multiplying the additional rate α by the present power selling piece rate acquired by the power selling piece rate acquisition unit 24. That is, the price calculation unit 25 sets the power selling piece rate calculated newly, as the power selling piece rate used during the output suppression control, in the wattmeter 11. The power selling price, got by the reverse power flow of the surplus electricity during this time, is calculated using the new power selling piece rate. The following Table 1 shows one example of the power selling piece rate that has been set in a memory of the wattmeter 11, and for example, 48 yen is set as a normal power selling piece rate (a basic power selling piece rate). In this case, the power selling piece rate used during the output suppression control is set to 96 yen, when the coefficient α is 2. In the present embodiment, the power selling piece rate used during the output suppression control is obtained by multiplying a reference value for the power selling piece rate by the coefficient α used for calculating the threshold value for the amount of the electricity for sale. However, the power selling piece rate used during the output suppression control can be also obtained by multiplying the basic power selling piece rate by a value other than the coefficient α.

TABLE 1

| | |
|---|---|
| BASIC POWER SELLING PIECE RATE | 48 yen/kWh |
| POWER SELLING PIECE RATE USED DURING OUTPUT SUPPRESSION CONTROL | 96 yen/kWh |

The power selling suppression control unit 23 in the controller 20 acquires the voltage of the electric power system 2 from the voltage sensor 13 for each predetermined time, also during the output suppression control. When the voltage of the electric power system 2 becomes a predetermined reference value or less, the power selling suppression control unit 23 stops the suppression of the reverse power flow. When the suppression for power selling is stopped, the power selling piece rate is changed into the original setting value. Not to mention that a hysteresis can be also provided for the above-mentioned reference value.

Figure 3:
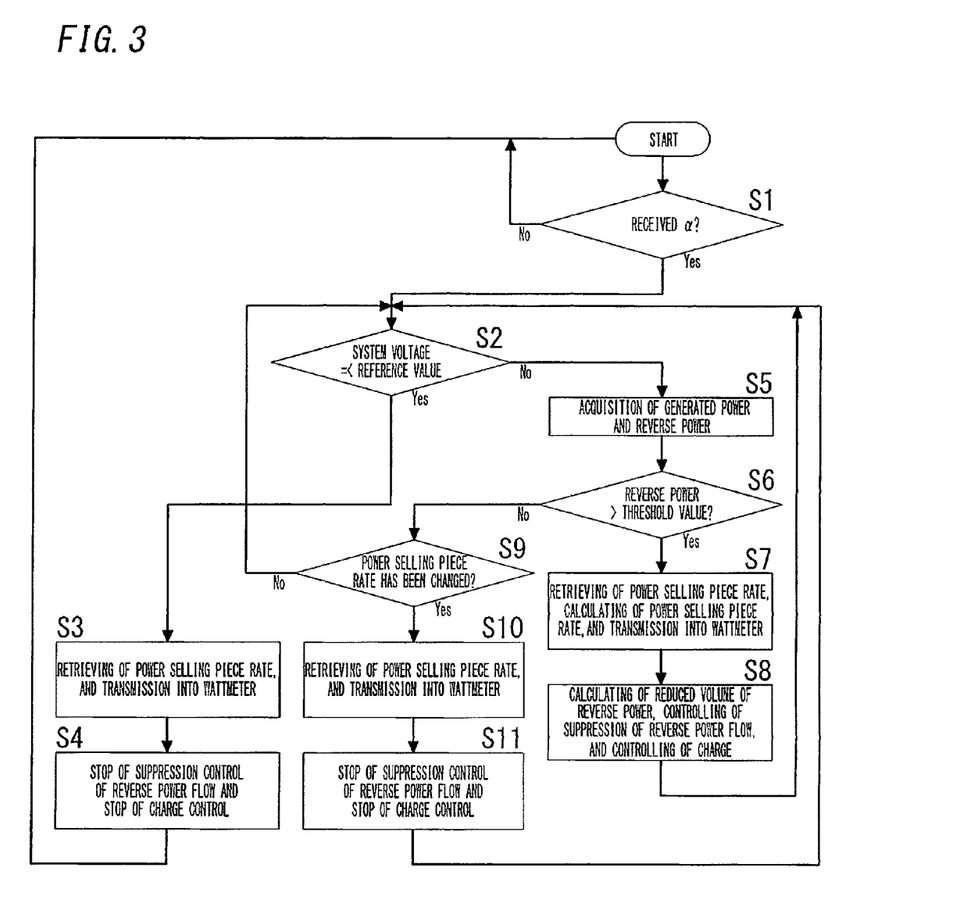
FIG. 3 is a flow chart for explaining operation according to the present embodiment.

Here, operation of the controller 20 is explained referring to a flow chart shown in FIG. 3. When the controller 20 is activated, the communication unit 28 in the controller 20 communicates with the management server 30 via the Internet 32 to receive the coefficient α. When the communication unit 28 has received the coefficient α (S1: Yes), the coefficient α is transmitted from the overall operation control unit 27 to the power selling suppression control unit 23. The power selling suppression control unit 23 stores the coefficient α in a memory (not shown). After that, the power selling suppression control unit 23 acquires the voltage of the electric power system 2 from the voltage sensor 13 for each predetermined time, and determines whether or not the system voltage exceeds a reference value (S2). When the system voltage is less than or equal to the reference value (S2: Yes), the power selling suppression control unit 23 retrieves the basic power selling piece rate from the memory and then transmits the basic power selling piece rate into the wattmeter 11 to make the wattmeter 11 calculate the power selling price, using the basic power selling piece rate (S3). Also, the power selling suppression control unit 23 stops the suppression of the reverse power flow into the electric power system 2, and stops the charging of the storage battery 3 (S4). After that, the processing flow is returned to S1, and the above-mentioned processing is repeated.

Meanwhile, when the system voltage exceeds the reference value (S2: No), the power selling suppression control unit 23 acquires the amount of the sold power (the reverse power) from the power selling amount acquisition unit 21 and acquires the power generation amount (the generated electricity) from the power generation amount acquisition unit 22 (S5). Then, the power selling suppression control unit 23 sets, as a threshold value, a value (the generated electricity/α) obtained by dividing the generated electricity by the coefficient α. Here, when the reverse power exceeds the threshold value (S6: Yes), the power selling suppression control unit 23 retrieves the basic power selling piece rate from the memory and then transmits, into the wattmeter 11, a value obtained by multiplying the basic power selling piece rate by the coefficient α, as a new power selling piece rate (S7). Also, the power selling suppression control unit 23 calculates electricity exceeding the threshold value, among the surplus electricity (=the generated electricity−the consumed electricity), as electricity suppressing the reverse power flow. Then, by controlling the power conditioner 6, the power selling suppression control unit 23 reduces the reverse power, and charges the storage battery 3, using electricity which has not been allowed to flow due to the reduction (S8). After that, the processing flow is returned to S2, and the above-mentioned processing is repeated.

When, at S6, the reverse power is less than or equal to the threshold value (S6: No), the power selling suppression control unit 23 determines whether or not the basic power selling piece rate set in the wattmeter 11 has been changed to the power selling piece rate used during the output suppression control (S9). Here, when the basic power selling piece rate is maintained (S9: No), the processing flow in the controller 20 is returned to S2, and the above-mentioned processing is repeated. On the other hand, when the basic power selling piece rate has been changed to the power selling piece rate used during the output suppression control (S9: Yes), the power selling suppression control unit 23 retrieves the basic power selling piece rate from the memory and then transmits into the wattmeter 11 to change the power selling piece rate, which has been set in the wattmeter 11, to the basic power selling piece rate (S10). Also, the power selling suppression control unit 23 stops the suppression of the reverse power flow into the electric power system 2, and stops the charging of the storage battery 3 (S11). After that, the processing flow is returned to S2, and the above-mentioned processing is repeated.

Thus, the electric power control device (the controller 20) includes: the power generation amount acquisition unit 22 acquiring the amount of electricity that has been generated in the power generation device (the dispersed power source 1) installed at a consumer side; the power selling amount acquisition unit 21 acquiring the amount of electricity for sale that has been allowed to flow into the electric power system 2 by reverse power flow, among the electricity generated in the power generation device; and the power selling suppression control unit 23 setting a threshold value for the amount of the electricity for sale, as proportional to the amount of the generated electricity acquired by the power generation amount acquisition unit 22, and suppressing the reverse power flow into the electric power system so that the amount of the electricity for sale is set to the threshold value or less.

For this reason, the amount of the electricity for sale is suppressed so as to be less than or equal to the threshold value that has been set as proportional to the amount of the electricity generated in the power generation device. Accordingly, the electric power control device can set the amount of the electricity for sale as in the case where a power generation device having small rated power is used. Thus, even when the number of the power generation devices interconnected with the electric power system is increased, the amount of electricity allowed to flow from each power generation device by the reverse power flow can be suppressed to a threshold value proportional to the amount of the generated electricity, and the electric power control device can stabilize the system voltage.

In the above explanation, the controller 20 at each consumer's house determines whether to perform the output suppression control. However, the management server 30 can also provide an instruction to the controller 20 at each consumer's house to perform the output suppression control. In this case, the operation is explained referring to a flow chart shown in FIG. 4.

Figure 4:
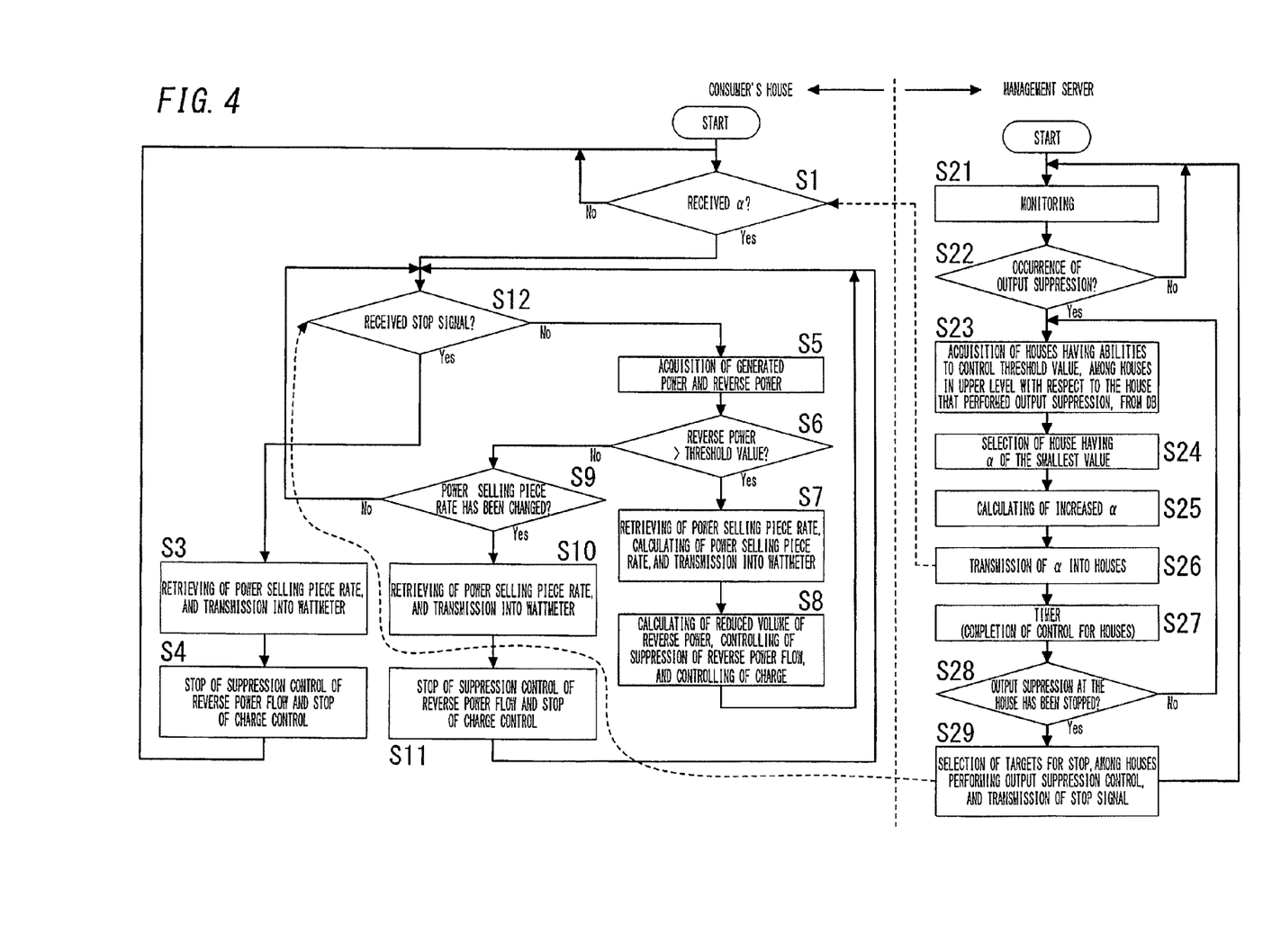
FIG. 4 is a flow chart for explaining operation according to the present embodiment.

First, the operation of the management server 30 is explained below. The management server 30 communicates with the electric power control device (the controller 20) which is installed at each consumer's house, and monitors whether or not the suppression operation of the reverse power flow is performed. When controllers 20 at any consumers' houses 10 do not perform the output suppression control (S22: No), the management server 30 maintains monitoring without instructions to houses 10 (S21). In contrast, when a controller 20 at any one of the consumers' houses 10 starts performing the output suppression control (S22: Yes), the management server 30 searches, from a data base, consumers' houses 10 having abilities to perform the output suppression control, among consumers' houses 10 connected to the electric power system 2 at a location closer than this consumer's house 10 with respect to a pole transformer (S23). For example, the management server 30 selects a consumer's house having the coefficient $\alpha$ of the smallest value from among the consumers' houses extracted in the processing of S23 (S24), and increases the coefficient $\alpha$ by adding a predetermined amount (S25), and then transmits the increased coefficient $\alpha$ to controllers 20 installed at target consumers' houses (S26). After that, the management server 30 activates a timer (not shown) to count a certain period of time (S27) (the certain period of time is slightly longer than times required to perform the output suppression control in the target consumers' houses to which the modified coefficient $\alpha$ is transmitted). When counting of the certain period of time is completed, the management server 30 determines whether or not the output suppression control has been stopped in the controller 20 at the consumer's house that has started to perform the output suppression control first (S28). When the output suppression control has not been stopped (S28: No), the processing flow is returned to S23, and the above-mentioned processing is repeated. On the other hand, when the output suppression control has been stopped at the consumer's house that has started to perform the output suppression control first (S28: Yes), the management server 30 selects consumer's house, from among the consumers' houses that have started to perform the output suppression control afterward, in order to stop the output suppression control, and transmits stop signals to the controllers 20 installed at the selected consumer's house (S29).

Operation of the controller 20 at each consumer's house is explained. In the controller 20 at each consumer's house, the communication unit 28 communicates with the management server 30 via the Internet 32, and then the controller 20 determines whether or not the coefficient $\alpha$ has been transmitted from the management server 30, for each predetermined timing. When the communication unit 28 receives the coefficient $\alpha$ (S1: Yes), the coefficient $\alpha$ is transmitted from the overall operation control unit 27 to the power selling suppression control unit 23. Then, the unit 23 stores the coefficient $\alpha$ in a memory (not shown). Then, the controller 20 determines whether or not the communication unit 28 has received the stop signal from the management server 30 (S12).

Here, when the communication unit 28 has not received the stop signal (S12: No), the power selling suppression control unit 23 acquires the amount of the sold electricity and the amount of the generated electricity from the power selling amount acquisition unit 21 and the power generation amount acquisition unit 22, respectively (S5). Then, the unit 23 sets a value (the generated electricity/$\alpha$) obtained by dividing the generated electricity by the coefficient $\alpha$, as a threshold value. When the reverse power exceeds the threshold value (S6: Yes), the power selling suppression control unit 23 functioning as the threshold value setting unit retrieves the basic power selling piece rate from the memory, and transmits, into the wattmeter 11, a value obtained by multiplying the basic power selling piece rate by the coefficient $\alpha$, as a new power selling piece rate (S7). The power selling suppression control unit 23 calculates electricity exceeding the threshold value, among the surplus electricity (=the generated electricity−the consumed electricity), as electricity suppressing the reverse power flow. Then, by controlling the power conditioner 6, the power selling suppression control unit 23 reduces the reverse power, and charges the storage battery 3, using electricity which has not been allowed to flow due to the reduction (S8). After that, the processing flow is returned to S12, and the above-mentioned processing is repeated.

When the reverse power is less than or equal to the threshold value (S6: No), the power selling suppression control unit 23 determines whether or not the basic power selling piece rate set in the wattmeter 11 has been changed to the power selling piece rate used during the output suppression control (S9). Here, when the basic power selling piece rate is maintained (S9: No), the processing flow in the controller 20 is returned to S12, and the above-mentioned processing is repeated. On the other hand, when the basic power selling piece rate has been changed to the power selling piece rate used during the output suppression control (S9: Yes), the power selling suppression control unit 23 retrieves the basic power selling piece rate from the memory and then transmits into the wattmeter 11 to change the power selling piece rate, which has been set in the wattmeter 11, to the basic power selling piece rate (S10). Also, the power selling suppression control unit 23 stops the suppression of the reverse power flow into the electric power system 2, and stops the charging of the storage battery 3 (S11). After that, the processing flow is returned to S12, and the above-mentioned processing is repeated.

When, at S12, the communication unit 28 has received the stop signal (S12: Yes), the power selling suppression control unit 23 retrieves the basic power selling piece rate from the memory and then transmits the basic power selling piece rate into the wattmeter 11 to make the wattmeter 11 calculate the power selling price, using the basic power selling piece rate (S3). Also, the power selling suppression control unit 23 stops the suppression of the reverse power flow into the electric power system 2, and stops the charging of the storage battery 3 (S4). After that, the processing flow is returned to S1, and the above-mentioned processing is repeated.

Thus, in the electric power control system according to the present embodiment, when detecting the suppression of the reverse power flow in a controller 20 (the electric power control device) installed at any one of the consumers' houses, the management server 30 instructs controllers 20 installed at the other consumers' houses, which do not suppress the reverse power flow, to increase the coefficient $\alpha$ (that is, to decrease the threshold value).

Figure 5:
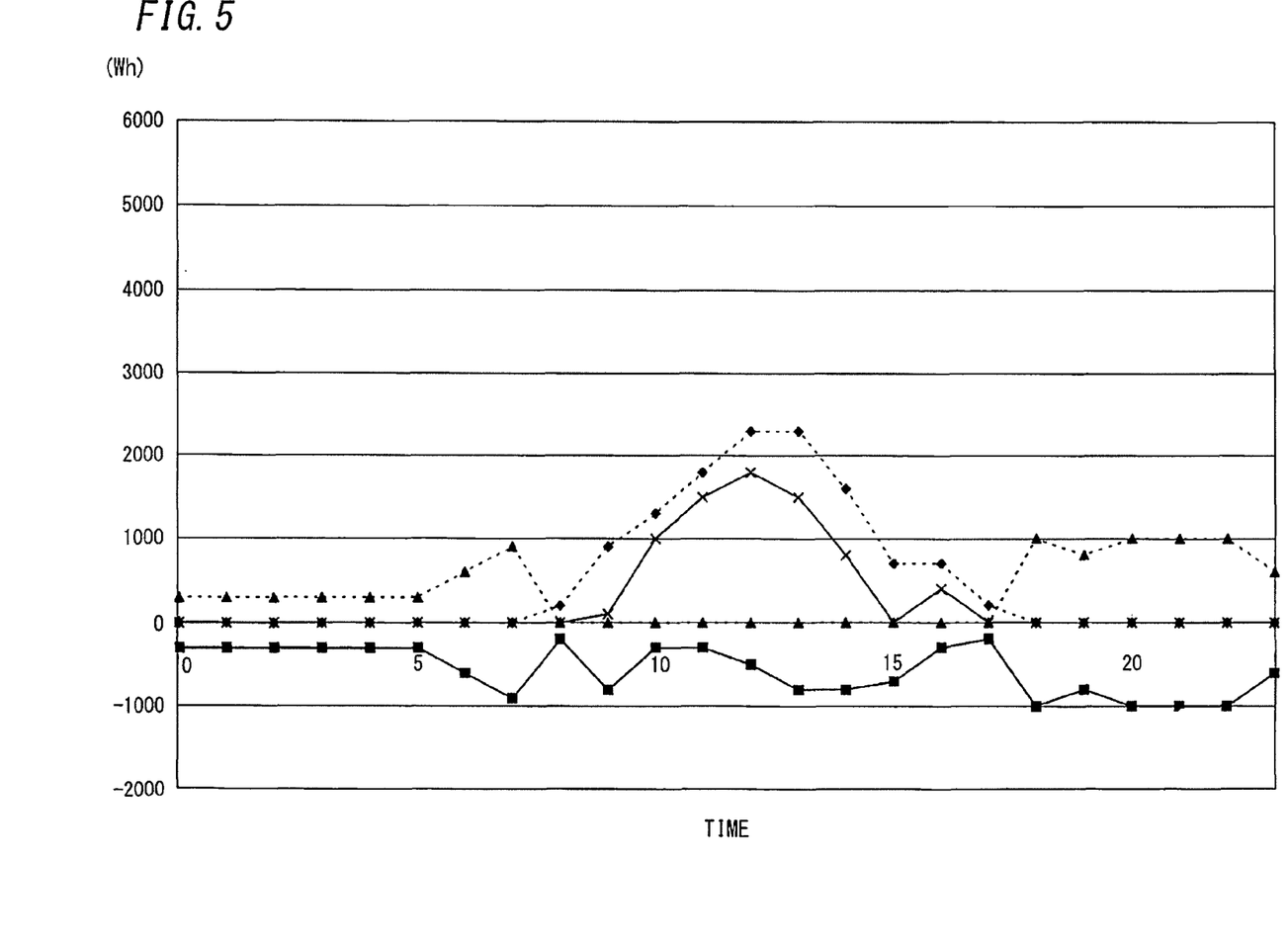
FIG. 5 is a diagram for explaining income and payout of electricity according to the present embodiment.

For this reason, the threshold value is decreased at the consumers' houses which do not perform the output suppression control. Therefore, the electric power control system can produce the condition where the output suppression control is easily executed, and can reduce a difference between frequencies of the output suppression controls generated at the consumer sides, and can correct an inequality among the consumer sides with respect to the electricity which is allowed to flow by the reverse power flow. When there are consumer sides which do not suppress the reverse power flow and do cause the increase in the system voltage, the electric power control system instructs the consumer sides to perform the suppression control of the reverse power flow. Therefore, the electric power control system can stabilize the system voltage.

result, the surplus electricity of 100 W is allowed to flow into the electric power system 2 by the reverse power flow. In this way, when adding the reverse powers (the amounts of the sold power) from 0 o'clock to 23 o'clock, the total is 7.1 kWh. When the power selling piece rate is 48 yen per 1 kWh, the total of the power selling prices is 340.8 yen. In this case, the total of the amounts of the generated power is 12 kWh.

TABLE 2

| TIME | GENERATED POWER (Wh) | POWER DEMAND (Wh) | PURCHASED POWER (Wh) | SOLD POWER (Wh) | SYSTEM INPUT-OUTPUT POWER (Wh) | POWER SELLING PIECE RATE (yen/kWh) | POWER SELLING PRICE (yen) |
|---|---|---|---|---|---|---|---|
| 0 | 0 | −300 | 300 | 0 | −300 | 48 | 0 |
| 1 | 0 | −300 | 300 | 0 | −300 | 48 | 0 |
| 2 | 0 | −300 | 300 | 0 | −300 | 48 | 0 |
| 3 | 0 | −300 | 300 | 0 | −300 | 48 | 0 |
| 4 | 0 | −300 | 300 | 0 | −300 | 48 | 0 |
| 5 | 0 | −300 | 300 | 0 | −300 | 48 | 0 |
| 6 | 0 | −600 | 600 | 0 | −600 | 48 | 0 |
| 7 | 0 | −900 | 900 | 0 | −900 | 48 | 0 |
| 8 | 200 | −200 | 0 | 0 | 0 | 48 | 0 |
| 9 | 900 | −800 | 0 | 100 | 100 | 48 | 4.8 |
| 10 | 1300 | −300 | 0 | 1000 | 1000 | 48 | 48 |
| 11 | 1800 | −300 | 0 | 1500 | 1500 | 48 | 72 |
| 12 | 2300 | −500 | 0 | 1800 | 1800 | 48 | 86 |
| 13 | 2300 | −800 | 0 | 1500 | 1500 | 48 | 72 |
| 14 | 1600 | −800 | 0 | 800 | 800 | 48 | 38 |
| 15 | 700 | −700 | 0 | 0 | 0 | 48 | 0 |
| 16 | 700 | −300 | 0 | 400 | 400 | 48 | 19 |
| 17 | 200 | −200 | 0 | 0 | 0 | 48 | 0 |
| 18 | 0 | −1000 | 1000 | 0 | −1000 | 48 | 0 |
| 19 | 0 | −800 | 800 | 0 | −800 | 48 | 0 |
| 20 | 0 | −1000 | 1000 | 0 | −1000 | 48 | 0 |
| 21 | 0 | −1000 | 1000 | 0 | −1000 | 48 | 0 |
| 22 | 0 | −1000 | 1000 | 0 | −1000 | 48 | 0 |
| 23 | 0 | −600 | 600 | 0 | −600 | 48 | 0 |
| TOTAL | 12000 | −13600 | 8700 | 7100 | −1600 | | 340.8 |

As explained above, the controller 20 and the management server 30 are operated. Here, when the coefficient α is set to 2 and the threshold value is one-half of the amount of the generated power and the power selling piece rate used during the output suppression control is twice the basic power selling piece rate, the specific examples of the amount of the sold power and the power selling price are explained below.

Figure 6:
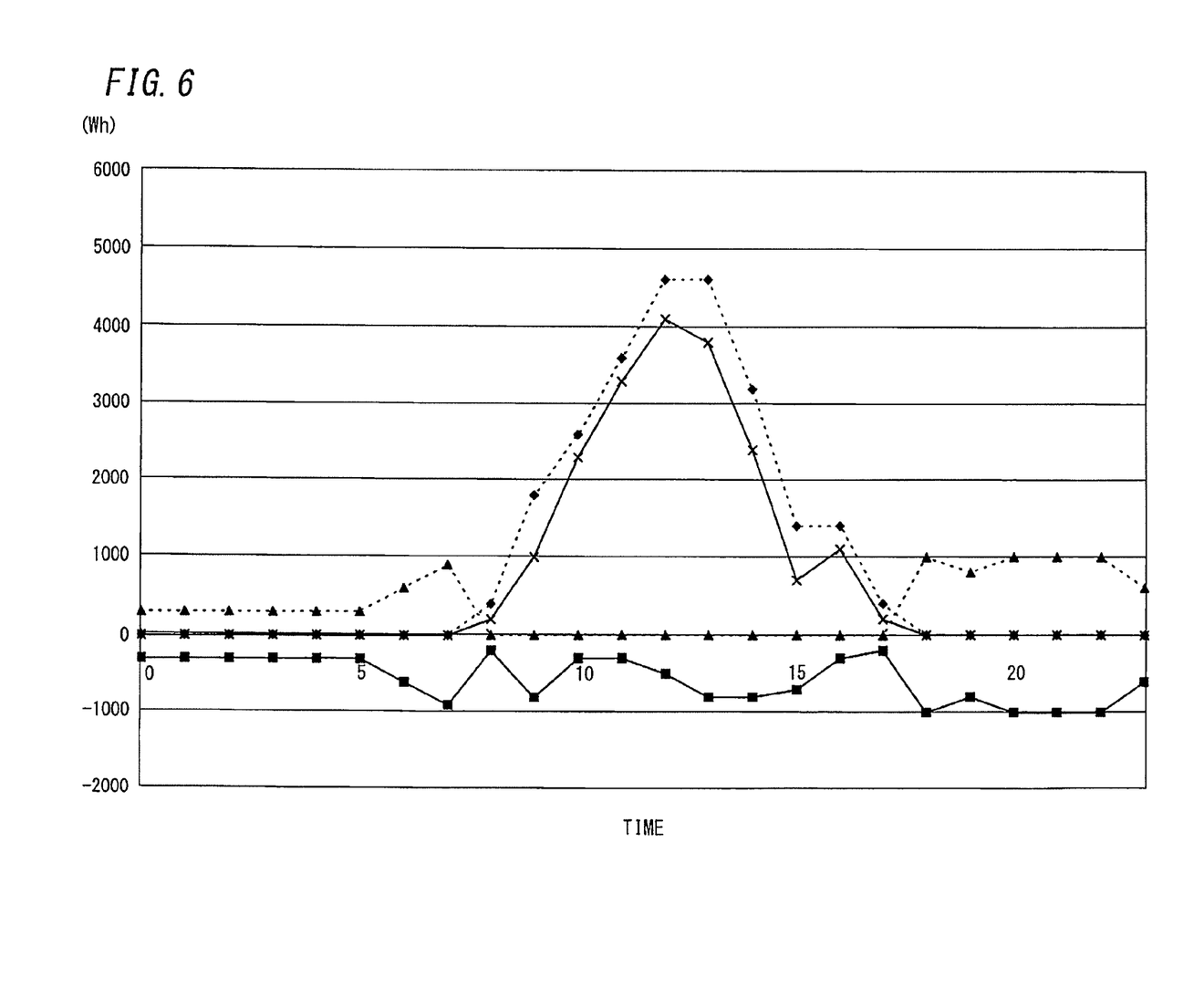
FIG. 6 is a diagram for explaining income and payout of electricity according to the present embodiment.

Table 2 and FIG. 5 show income and payout of electricity, in the case where the solar cell 5 having 3 kWh of the rated output is installed at the consumer's house 10 and the surplus electricity, obtained by subtracting the consumed amount from the amount of the generated power, is allowed to flow into the electric power system 2 by the reverse power flow. In FIG. 5, marks representing black diamond shapes on a dashed line show the amount of the generated power. Marks representing black square shapes on a solid line show the amount of power demand. Then, marks representing black triangles on a dashed line show the amount of the purchased power. Marks representing X on a solid line show the amount of the sold power. In this example, the amount of the generated power is 200 W at 8 o'clock and at this time, the amount of the power demand is 200 W. Therefore, the surplus electricity becomes zero, and the reverse power flow into the electric power system 2 is not performed. Meanwhile, the amount of the generated power is increased to 900 W at 9 o'clock and exceeds the amount of the power demand by 100 W. As a Then, Table 3 and FIG. 6 show income and payout of electricity, in the case where the solar cell 5 having 6 kWh of the rated output is installed and the rated output is twice 3 kWh of the above-mentioned rated output. In this case, the amount of the generated power is twice that shown in Table 2. The power demand is equal to that shown in Table 2. In FIG. 6, marks representing black diamond shapes on a dashed line show the amount of the generated power. Marks representing black square shapes on a solid line show the amount of power demand. Then, marks representing black triangles on a dashed line show the amount of the purchased power. Marks representing X on a solid line show the amount of the sold power.

When the rate output of the solar cell 5 doubles, because the power demand does not change, the surplus electricity increases greatly and the total of the reverse powers (the amounts of the sold power) from 0 o'clock to 23 o'clock becomes 19.1 kWh. When the power selling piece rate is 48 yen per 1 kWh, the total of the power selling prices per day becomes 916.8 yen. In this case, the total of the amounts of the sold power and the total of the power selling prices increase about 2.7-fold, compared with the case where the rated output of the solar cell 5 is 3 kWh. However, when the system voltage of the electric power system 2 is increased for example in a time slot from 11 o'clock to 14 o'clock and the output suppression control is performed, the conventional system only reduces the reverse power to zero during this time slot. Therefore, in the conventional system, the total of the reverse powers per day decreases by 13.6 kW, and the total of the power selling prices decreases by 652.8 yen.

TABLE 3

| TIME | GENERATED POWER (Wh) | POWER DEMAND (Wh) | PURCHASED POWER (Wh) | SOLD POWER (Wh) | SYSTEM INPUT-OUTPUT POWER (Wh) | POWER SELLING PIECE RATE (yen/kWh) | POWER SELLING PRICE (yen) |
|---|---|---|---|---|---|---|---|
| 0 | 0 | −300 | 300 | 0 | −300 | 48 | 0 |
| 1 | 0 | −300 | 300 | 0 | −300 | 48 | 0 |
| 2 | 0 | −300 | 300 | 0 | −300 | 48 | 0 |
| 3 | 0 | −300 | 300 | 0 | −300 | 48 | 0 |
| 4 | 0 | −300 | 300 | 0 | −300 | 48 | 0 |
| 5 | 0 | −300 | 300 | 0 | −300 | 48 | 0 |
| 6 | 0 | −600 | 600 | 0 | −600 | 48 | 0 |
| 7 | 0 | −900 | 900 | 0 | −900 | 48 | 0 |
| 8 | 400 | −200 | 0 | 200 | 200 | 48 | 10 |
| 9 | 1800 | −800 | 0 | 1000 | 1000 | 48 | 48 |
| 10 | 2600 | −300 | 0 | 2300 | 2300 | 48 | 110 |
| 11 | 3600 | −300 | 0 | 3300 | 3300 | 48 | 158 |
| 12 | 4600 | −500 | 0 | 4100 | 4100 | 48 | 197 |
| 13 | 4600 | −800 | 0 | 3800 | 3800 | 48 | 182 |
| 14 | 3200 | −800 | 0 | 2400 | 2400 | 48 | 115 |
| 15 | 1400 | −700 | 0 | 700 | 700 | 48 | 34 |
| 16 | 1400 | −300 | 0 | 1100 | 1100 | 48 | 53 |
| 17 | 400 | −200 | 0 | 200 | 200 | 48 | 10 |
| 18 | 0 | −1000 | 1000 | 0 | −1000 | 48 | 0 |
| 19 | 0 | −800 | 800 | 0 | −800 | 48 | 0 |
| 20 | 0 | −1000 | 1000 | 0 | −1000 | 48 | 0 |
| 21 | 0 | −1000 | 1000 | 0 | −1000 | 48 | 0 |
| 22 | 0 | −1000 | 1000 | 0 | −1000 | 48 | 0 |
| 23 | 0 | −600 | 600 | 0 | −600 | 48 | 0 |
| TOTAL | 24000 | −13600 | 8700 | 19100 | 10400 | | 916.8 |

Figure 7:
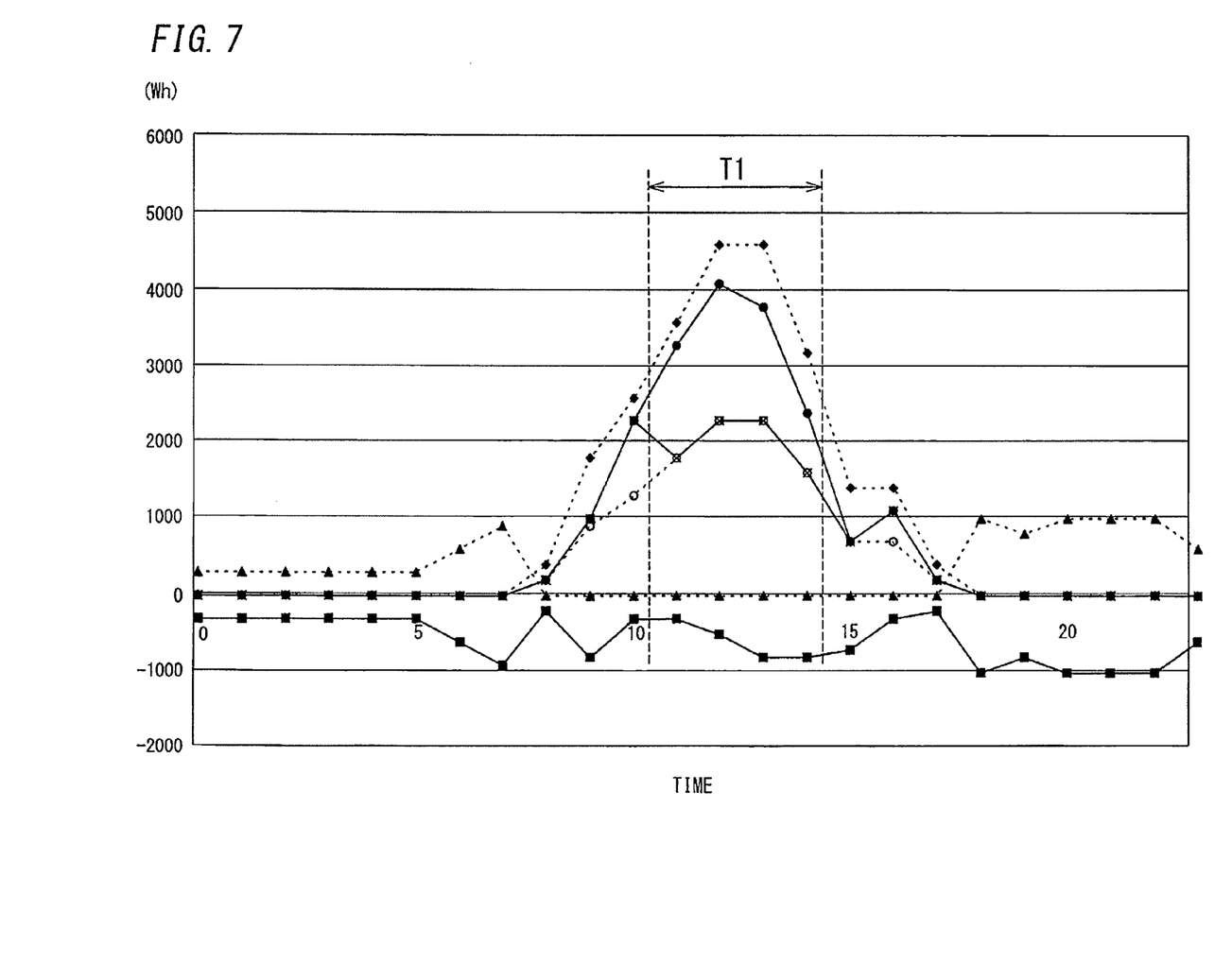
FIG. 7 is a diagram for explaining income and payout of electricity according to the present embodiment.

On the other hand, when the system voltage of the electric power system 2 exceeds the reference value, the electric power control system in the present embodiment suppresses the reverse power to stabilize the system voltage, and sets the power selling piece rate used during the output suppression control higher than the basic power selling piece rate, in order to provide an appropriate incentive for the consumer. Income and payout of electricity according to the present embodiment is explained referring to Table 4 and FIG. 7. In FIG. 7, marks representing black diamond shapes on a dashed line show the amount of the generated power. Marks representing black square shapes on a solid line show the amount of power demand. Then, marks representing black triangles on a dashed line show the amount of the purchased power. Marks representing X on a solid line show the amount of the sold power. Marks representing white circles on a dashed line show the threshold value. Marks representing black circles on a solid line show the surplus electricity. The coefficient α is set to 2 for example, and the threshold value for the amount of electricity for sale is set to one-half of the amount of the generated power, and the power selling piece rate used during the output suppression control is set as twice the basic power selling piece rate. Because the amount of the electricity generated in the solar cell 5 is increased with the sun elevation and the reverse power is increased, the reverse power flow into the electric power system 2 is suppressed during a period T1 from 11 o'clock to 14 o'clock. In this case, because the reverse power flow is not suppressed during a period from 0 o'clock to 10 o'clock and during a period from 15 o'clock to 23 o'clock, all of the surplus electricity, obtained by subtracting the power demand from the amount of the electricity generated in the solar cell 5, is allowed to flow by the reverse power flow. On the other hand, the amount of the electricity allowed to flow into the electric power system 2 is suppressed to the threshold value or less during the period T1 from 11 o'clock to 14 o'clock. Then, electricity exceeding the threshold value, among the surplus electricity, is used for charging the storage battery 3. When the reverse power flow is performed during the period T1, a value obtained by multiplying an additional rate (α=2) by the basic power selling piece rate is used as a new power selling piece rate. Then, the power selling price is calculated using the new power selling piece rate.

Although, normally, 13.6 kWh of the electricity can be sold during the period T1, because the amount of electricity for sale is suppressed to the threshold value (one-half of the amount of the generated power) as described above, the amount of the sold power during the period T1 becomes 8 kWh and decreases by 5.6 kWh, compared with the case where the output suppression control is not performed. However, because the power selling piece rate is set to 96 yen/kWh, which is double the basic power selling piece rate, during the period T1, the amount of money got by power selling becomes 768 yen. As a result, the consumer can obtain more benefits than the power selling price (653 yen) got in the case where 13.6 kWh of the power is sold with the power selling piece rate of 48 yen (the case where the output suppression control is not performed). In addition, the total of the amounts of the sold power from 0 o'clock to 23 o'clock becomes 13.5 kWh, and the total of the power selling prices becomes 1032 yen.

TABLE 4

| TIME | GENERATED POWER (Wh) | POWER DEMAND (Wh) | PURCHASED POWER (Wh) | SOLD POWER (Wh) | THRESHOLD VALUE (Wh) | SURPLUS ELECTRICITY (Wh) | POWER SELLING PIECE RATE (yen/kWh) | POWER SELLING PRICE (yen) |
|---|---|---|---|---|---|---|---|---|
| 0 | 0 | −300 | 300 | 0 | 0 | 0 | 48 | 0 |
| 1 | 0 | −300 | 300 | 0 | 0 | 0 | 48 | 0 |
| 2 | 0 | −300 | 300 | 0 | 0 | 0 | 48 | 0 |
| 3 | 0 | −300 | 300 | 0 | 0 | 0 | 48 | 0 |
| 4 | 0 | −300 | 300 | 0 | 0 | 0 | 48 | 0 |
| 5 | 0 | −300 | 300 | 0 | 0 | 0 | 48 | 0 |
| 6 | 0 | −600 | 600 | 0 | 0 | 0 | 48 | 0 |
| 7 | 0 | −900 | 900 | 0 | 0 | 0 | 48 | 0 |
| 8 | 400 | −200 | 0 | 200 | 200 | 200 | 48 | 10 |
| 9 | 1800 | −800 | 0 | 1000 | 900 | 1000 | 48 | 48 |
| 10 | 2600 | −300 | 0 | 2300 | 1300 | 2300 | 48 | 110 |
| 11 | 3600 | −300 | 0 | 1800 | 1800 | 3300 | 96 | 173 |
| 12 | 4600 | −500 | 0 | 2300 | 2300 | 4100 | 96 | 221 |
| 13 | 4600 | −800 | 0 | 2300 | 2300 | 3800 | 96 | 221 |
| 14 | 3200 | −800 | 0 | 1600 | 1600 | 2400 | 96 | 154 |
| 15 | 1400 | −700 | 0 | 700 | 700 | 700 | 48 | 34 |
| 16 | 1400 | −300 | 0 | 1100 | 700 | 1100 | 48 | 53 |
| 17 | 400 | −200 | 0 | 200 | 200 | 200 | 48 | 10 |
| 18 | 0 | −1000 | 1000 | 0 | 0 | 0 | 48 | 0 |
| 19 | 0 | −800 | 800 | 0 | 0 | 0 | 48 | 0 |
| 20 | 0 | −1000 | 1000 | 0 | 0 | 0 | 48 | 0 |
| 21 | 0 | −1000 | 1000 | 0 | 0 | 0 | 48 | 0 |
| 22 | 0 | −1000 | 1000 | 0 | 0 | 0 | 48 | 0 |
| 23 | 0 | −600 | 600 | 0 | 0 | 0 | 48 | 0 |
| TOTAL | 24000 | −13600 | 8700 | 13500 | 12000 | 19100 | | 1032 |

Therefore, during the period T1 for which the output suppression control is performed, the total of the amounts of the sold power is less than or equal to that of the case where all of the power generated in the solar cell 5 having one-half of the rated output is allowed to flow by the reverse power flow (that is, the case in Table 2). Also, the total of the power selling prices (1032 yen) becomes more than that (916.8 yen) in the system that does not perform the output suppression control (that is, the case in Table 3). Accordingly, the electric power control system in the present embodiment can provide more benefits for the consumer. Thus, the consumer can obtain an incentive for the suppression of the reverse power flow by performing the output suppression control according to the present embodiment.

If the storage battery 3 is installed using this incentive as cost depreciation, electricity which is not allowed to flow by the reverse power flow, among the surplus electricity, can be used for charging the storage battery. Then, when the power generated in the solar cell 5 is reduced, the storage battery discharges the electricity first, and the electricity is consumed by the electric loads 4 located within the house. Therefore, the purchase of the power can be suppressed.

Here, when the surplus electricity becomes less than the threshold value with the passage of time or after the output suppression control has been stopped, the storage battery discharges, for usage, the surplus electricity which has been stored during the output suppression control. At this time, the storage battery discharges with a range where the reverse power does not exceed the generated power (that is, a range where the discharge amount does not exceed the consumed amount). Therefore, among the generated power, the power used for the reverse power flow can be increased. Here, if it is necessary to distinguish the power which has been generated in the solar cell 5 during the output suppression control, from among the power stored in the storage battery, a wattmeter may be provided to measure the charge amount stored in the storage battery 3 during the output suppression control and then the above-mentioned discharge control may be performed within a range of the charge amount measured in the wattmeter. Also, a first storage battery may be provided to store only the surplus electricity, among the power generated in the solar cell 5, during the output suppression control, separately from a second storage battery provided for the other usage. In this case, when the surplus electricity becomes less than the threshold value or after the output suppression control has been stopped, only the first storage battery may be discharged.

As explained above, according to the present embodiment, the power selling suppression control unit 23 in the electric power control device sets a threshold value for the amount of electricity for sale, as proportional to the amount of the generated electricity acquired by the power generation amount acquisition unit 22. Then, the power selling suppression control unit 23 suppresses the reverse power flow into the electric power system so that the amount of the electricity for sale is set to the threshold value or less.

For this reason, even when the reverse power flow is performed, electricity exceeding the power demand within the house, among electricity supplied from the power conditioner 6 to the distribution board 7, becomes the surplus electricity and is allowed to flow into the electric power system 2 by the reverse power flow. However, because the amount of the electricity for sale is suppressed to the threshold value or less, the electric power control device can reduce the voltage of the electric power system 2, and can prevent the instability of the voltage in the electricity network. Furthermore, because the reverse power is suppressed at all consumers' houses, the electric power control device can prevent an inequality generated among the consumer sides.

In addition, the electric power control device uses, as a new power selling piece rate, a value obtained by multiplying a ratio α of the amount of the generated electricity to the threshold value by a basic power selling piece rate. At this time, the new power selling piece rate is set higher than the basic power selling piece rate.

Although, for the consumer, the amount of the sold power is reduced due to the suppression of the reverse power flow despite the condition where the reverse power flow of the surplus electricity can be performed, the electric power control device can prevent the power selling price from falling below that before the output suppression control, by setting the new power selling piece rate higher than the basic power selling piece rate. Therefore, even in the case where the reverse power flow at the consumer's house 10 is suppressed to stabilize the voltage of the electric power system 2, the electric power control device can reduce the consumer's economic damage, thereby preventing that the consumer's drive to install the dispersed power source 1 is eroded. Furthermore, although the electric power provider needs to buy overvalued electricity by setting the new power selling piece rate higher than the basic power selling piece rate, the electric power control device has the advantage that the cost can be kept down, compared with the case where a large energy storage system is installed in the electricity network in order to stabilize the system voltage of the electric power system 2.

Further, the electric power control device uses the above-mentioned new power selling piece rate for calculating the power selling price, only when the reverse power flow is suppressed by the power selling suppression control unit 23.

Therefore, the electric power control device can prevent a benefit from being provided excessively for the consumers.

Also, according to the present embodiment, the electric power control device further comprises: the storage battery 3 storing electricity that have not been allowed to flow by the suppression of the reverse power flow, when the reverse power flow is suppressed by the power selling suppression control unit 23; and the charge-discharge control unit 26 controlling charging and discharging of the storage battery 3. Then, when surplus electricity, obtained by subtracting consumed amount from the amount of electricity that has been generated in the solar cell 5, does not exceed a threshold value, the charge-discharge control unit 26 controls discharging of the storage battery 3 to supply electricity into the electric loads 4, thereby increasing electricity allowed to flow into the electric power system by the reverse power flow.

Accordingly, the storage battery 3 stores the electricity that have not been allowed to flow by the suppression of the reverse power flow. Then, when the surplus electricity, obtained by subtracting the consumed amount from the amount of the generated electricity, becomes the threshold value or less, the electricity stored in the storage battery 3 is discharged, thereby increasing electricity for sale. Therefore, the electric power control device can provide more benefits for the consumer installing the storage battery 3, and can prompt the consumer sides to install the storage battery 3.

Then, according to the present embodiment, the suppression amount of the reverse power flow can be changed in real time by changing the coefficient α used for determining the threshold value. Also, when the output suppression control is performed with increase in the system voltage of the electric power system 2, the reverse power can be locally reduced by transmitting, into each consumer's house 10, the coefficient α used for determining the threshold value.

In the present embodiment, the storage battery 3 is installed at the consumer's house 10 side, and stores part (surplus) of electricity that has been generated in the solar cell 5 during the output suppression control, however, the electric power control system may be adopted, in which the storage battery 3 is not installed at the consumer's house 10 side.

Although the present invention has been described with reference to certain preferred embodiments, numerous modifications and variations can be made by those skilled in the art without departing from the true spirit and scope of this invention, namely claims.

The invention claimed is:

1. An electric power control device, comprising:
 a power generation amount acquisition unit acquiring an amount of electricity that has been generated in a power generation device installed at a consumer side;
 a power selling amount acquisition unit acquiring an amount of electricity for sale that has been allowed to flow into an electric power system by reverse power flow, among the electricity generated in said power generation device;
 a threshold value setting unit configured to set a threshold value for the amount of the electricity for sale, as proportional to the amount of the generated electricity acquired by said power generation amount acquisition unit; and
 a power selling suppression control unit configured to suppress the reverse power flow into said electric power system so that the amount of the electricity for sale is set to said threshold value or less.

2. The electric power control device according to claim 1, further using, as a new power selling piece rate, a value obtained by multiplying a ratio of the amount of the generated electricity to said threshold value by a basic power selling piece rate.

3. The electric power control device according to claim 2, wherein said new power selling piece rate is used for calculating a power selling price, when the reverse power flow is suppressed by said power selling suppression control unit.

4. The electric power control device according to claim 1, further comprising:
 a storage battery storing electricity that have not been allowed to flow by the suppression of the reverse power flow, when the reverse power flow is suppressed by said power selling suppression control unit; and
 a charge-discharge control unit controlling charging and discharging of said storage battery,
 wherein when surplus electricity, obtained by subtracting consumed amount from the amount of the electricity that has been generated in said power generation device, does not exceed said threshold value, said charge-discharge control unit controls discharging of said storage battery to supply electricity into a load, thereby increasing electricity allowed to flow into said electric power system by the reverse power flow.

5. The electric power control device according to claim 1, wherein said threshold value is set by dividing the amount of the generated electricity acquired by said power generation amount acquisition unit by a coefficient α which is more than 1.

6. An electric power control system, comprising:
 the electric power control device according to claim 1, installed at each of a plurality of consumer sides; and
 a management server communicating with the electric power control device to monitor and control a suppression state of the reverse power flow,
 wherein when the electric power control device installed at any one of said plurality of consumer sides suppresses the reverse power flow, said management server instructs electric power control devices installed at consumer sides, which do not suppress the reverse power flow, to decrease said threshold value.

* * * * *